United States Patent [19]
Tieman

[11] 3,869,822
[45] Mar. 11, 1975

[54] FISHHOOK EXTRACTOR

[76] Inventor: Lloyd E. Tieman, 601 E. 14th St., Carthage, Mo. 64836

[22] Filed: July 5, 1973

[21] Appl. No.: 376,815

[52] U.S. Cl. ............................................... 43/53.5
[51] Int. Cl. ........................................... A01k 97/00
[58] Field of Search ........................ 43/53.5; 128/19

[56] References Cited
UNITED STATES PATENTS

| | | | |
|---|---|---|---|
| 1,728,864 | 9/1929 | Kramer | 43/53.5 |
| 2,578,289 | 12/1951 | Danielson | 43/53.5 |
| 2,688,816 | 9/1954 | Bondesen | 43/53.5 |
| R24,902 | 12/1960 | Dillard | 43/53.5 |

Primary Examiner—Warner H. Camp
Attorney, Agent, or Firm—John A. Hamilton

[57] ABSTRACT

An extractor for removing a fishhook from a fish into the throat of which it has passed to an unusually great depth, consisting of a slender instrument adapted to be inserted into the throat of the fish and having at its inner end an anvil adapted to be engaged in the bight of the hook, and stripper plates movable relative to the anvil to strip the flesh of the fish from the point and barb of the hook, and to shield the hook point as the hook is removed through the mouth, the anvil and stripper plates being operable from the opposite end of the instrument.

6 Claims, 7 Drawing Figures

PATENTED MAR 11 1975 3,869,822
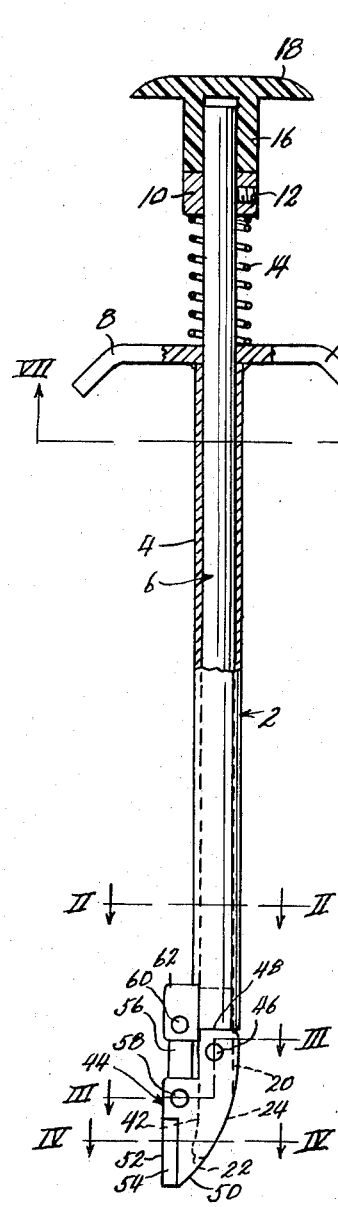
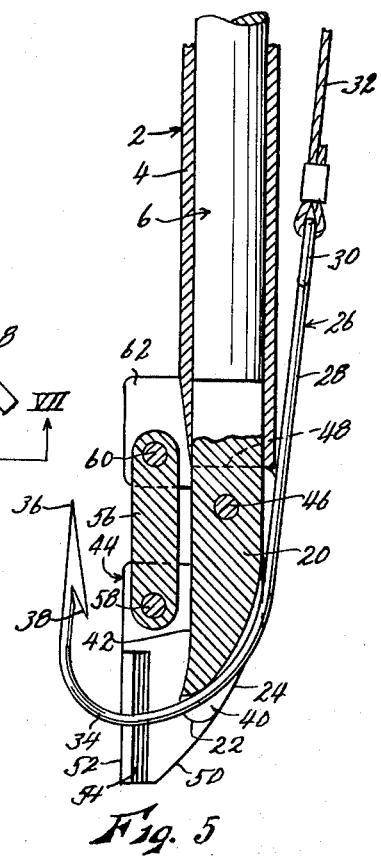
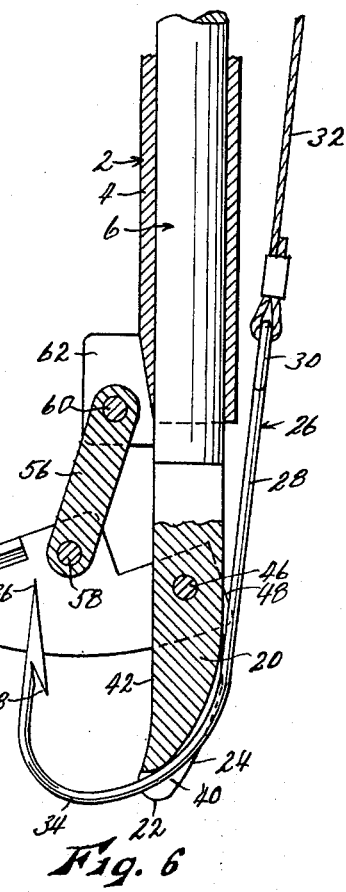
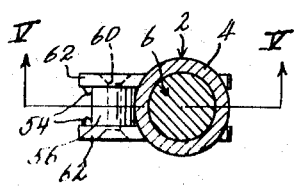
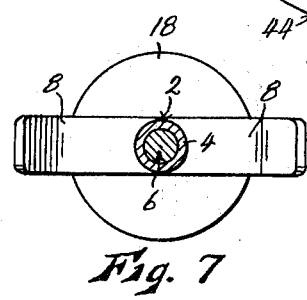
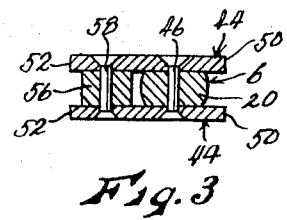
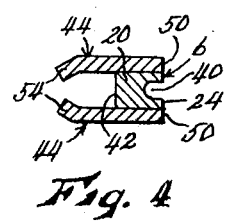

FISHHOOK EXTRACTOR

This invention relates to new and useful improvements in fishing accessories, and has particular reference to a device for extracting a fishhook from a fish in which it is engaged. Every fisherman has experienced the difficulties encountered when a fish has "swallowed" the hook, that is, when the hook does not engage the lip or mouth of the fish, where it can readily be manually grasped and manipulated for extraction, but instead has moved much more deeply into the throat before its point and barb becomes engaged in the flesh. The hook may still be visible through the open mouth of the fish, but is often disposed so far down the throat as to be difficult or impossible to grasp and manipulate for manual extraction. The provision of a tool or instrument for extracting such swallowed hooks in a rapid, easy and convenient operation is the object of the present invention.

Generally, this object is accomplished by the provision of a slender, rod-like instrument adapted to be inserted into the throat of the fish through the mouth, and having at its inner end an anvil member adapted to be engaged in the bight portion of the hook, so as to be disposed between the point and shank portions of the hook, a pair of stripper plates disposed at respectively opposite sides of said anvil so as to be positioned at respectively opposite sides of, but in closely spaced relation to, the plane of the hook, and means operable to move said stripper plates relative to said anvil in a direction toward and past the point of the hook, whereby the flesh of the fish is stripped from the point and barb of the hook, and the point is shielded against reengagement thereof as it is withdrawn through the mouth. Relative movement of the anvil and stripper plates is controlled by manually operable means at the outer end of the instrument.

Other objects are simplicity and economy of construction, and efficiency and dependability of operation.

With these objects in view, as well as other objects which will appear in the course of the specification, reference will be had to the accompanying drawing, wherein:

FIG. 1 is a side elevational view of a fishhook extractor embodying the present invention, with parts broken away and shown in section, FIGS. 2, 3, and 4 are enlarged sectional views taken respectively on lines II—II, III—III, and IV—IV of FIG. 1, FIG. 5 is a fragmentary sectional view taken on line V—V of FIG. 2, shown engaged with a fishhook in the first step of its operation in the extraction of said hook, FIG. 6 is a view similar to FIG. 5, but with the stripper plates pivoted in the second step of the extraction of the hook, and FIG. 7 is a sectional view taken on line VII—VII of FIG. 1.

Like reference numerals apply to similar parts throughout the several views, and the numeral 2 applies generally to the shank portion of the fishhook extractor forming the subject matter of the present invention. Said shank comprises an elongated tube 4, in which an elongated rod 6 is disposed for axial sliding movement, said rod projecting from both ends of the tube. At the upper end of tube 4, as shown in FIG. 1, which will be its outer end in use, said tube is provided with oppositely laterally extending finger grip bars 8. Rod 6 projects outwardly from this end of the tube, and disposed on the extended portion thereof is a collar 10, affixed thereon by set screw 12. A helical spring 14 encircles the rod and is compressed between collar 10 and finger bars 8. A handle 16 having a broad circular head 18, which may be formed of plastic or the like, is press fitted on the extreme upper end of rod 6.

The portion of rod 6 extending from the opposite or lower end of tube 4 is flattened and constitutes what may be termed an anvil member 20. The free end of the anvil member is rounded, as indicated at 22, and one longitudinal edge 24 thereof, which may be termed its rearward edge, is curved to conform generally to the curvature of the bight portion of an ordinary fishhook. Such a fishhook, shown in FIGS. 5 and 6 and indicated generally by the numeral 26, includes a straight shank 28 at one end of which is formed an eye 30 in which the fishing line or leader 32 is secured and the opposite end of which is bent to form a re-entrant bight portion 34, at the free end of which is disposed the point 36 and barb 38 of the hook. The transverse thickness of anvil 20 is greater than the diameter of the wire of which the hook is formed, and a groove 40 formed in curved edge 24 thereof is also wider than the wire diameter, whereby to be engageable over the hook wire in the bight portion 34 of the hook, as shown in FIGS. 5 and 6. Groove 40 extends through the rounded end 22 of the anvil, whereby to open through the forward edge 42 of the anvil. The width of the anvil, between the rearward and forward edges 24 and 42 thereof, is substantially less than the throat opening of the fishhook, which may be stated generally to be the distance between the point 36 and shank 28 of the hook.

Disposed at each side of anvil 20 is a generally planar stripper plate 44, said plates being pivoted, adjacent their upper edges, to anvil 20 on a common pivot pin 46 disposed transversely to said anvil. Each stripper plate has an upper edge 48 which, in the normal position of said plates shown in FIG. 1, abuts the lower end of tube 4 to limit the upward movement of rod 6 under the impetus of spring 14. In this normal position, each plate has a rearward edge 50 which is curved to coincide with the curved rearward edge 24 of the anvil, and a straight forward edge 52 which is parallel to the shank axis, but spaced forwardly of the forward edge 42 of anvil 20. The distance from the forward edges 52 of the stripper plates to the rearward edge 24 of the anvil is substantially less than the throat dimension of the fishhook. The stripper plates extend somewhat beyond the free end of the anvil, and the forward edge portions of the stripper plates are turned inwardly to form convergent lips 54, the minimum transverse spacing between said lips, as shown in FIG. 4, preferably being about equal to the transverse width of wire groove 40 of the anvil.

A link 56, which is normally parallel to but spaced forwardly of the axis of shank 2, is disposed at its lower end between stripper plates 44, and is pivoted to both of said plates by a common pivot pin 58 parallel with but spaced below pin 46. At its upper end, link 56 is pivoted, by means of a pivot pin 60 parallel with but spaced above pin 46, between a pair of ears 62 affixed to tube 4. Pins 46 and 58 directly interconnect the two stripper plates 44, and cause said plates to move in transversely coincident relationship at all times.

The extractor is adapted to be used whenever a fish has "swallowed" the fishhook, that is, when the hook is disposed so far down the throat that it cannot be reached and manipulated for extraction by ordinary means. In use, the fisherman inserts the anvil end of shank 2 into the fish's throat through the mouth and engages the anvil in the bight portion 34 of the fishhook as shown in FIG. 5, that is, with the rearward edge 24 of the anvil adjacent the shank of the hook, and its forward edge 42 toward the hook point, with bight portion 34 of the hook engaged in groove 40 of the anvil. Generally, this operation may be performed visually, since it is only rarely that the hook is swallowed to such a depth that it cannot be seen through the open mouth of the fish, even if it cannot be reached by ordinary means. Even in the rare instances that the hook cannot be seen, the operation can still be performed by "feel" or touch, since the engagement of groove 40 over the hook wire is readily detectable.

In this position it will be seen that the barb and point of the hook, which at this time is of course embedded in the flesh of the fish, will be disposed well forwardly of stripper plates 44, so that there will be no interference with the above described placement of the extractor. The bight portion of the fishhook will at this time extend between the lips 54 at the forward edges of the stripper plates, as shown.

Then, while holding fishing line or leader 32 taut to secure the hook in engagement with the anvil, the fisherman engages finger grip bars 8 with two fingers of one hand, respectively at opposite sides of the shank, and presses against head 18 of handle 16 with the heel of the same hand, whereby to move said handle and said finger grips closer together against the pressure of spring 14. Line 32 may conveniently be held taut as this operation is performed by laying said line between the heel of the hand and handle head 18, and during the operation, rod 6 is lowered relative to tube 4. Hence link 56 causes stripper plates 44 to pivot relative to the anvil to the position shown in FIG. 6. During this movement of the plates, the plate lips 54 move in a course generally paralleling the hook wire toward the point 36, in close proximity to the hook wire at either side thereof. This strips the flesh of the fish free of the hook, while movement of the hook with the flesh is resisted by the counter force of the anvil against the shank and bite portions of the hook. Also, it will be seen that in the FIG. 6 position, the point 36 of the hook is shielded between the stripper plates. The fisherman can then withdraw the extractor together with the hook, through the mouth of the fish with no danger that the hook will become re-engaged in the flesh.

While I have shown and described a specific embodiment of my invention, it will be readily apparent that many minor changes of structure and operation could be made without departing from the spirit of the invention.

What I claim as new and desire to protect by Letters Patent is:

1. A fishhook extractor comprising:
  a. a slender, elongated shank,
  b. an anvil mounted on one end of said shank, said anvil being elongated in a direction parallel to said shank and having opposite longitudinal edges designated respectively its forward and rearward edges, and being adapted to be engaged interiorly in the bight portion of a fishhook with its forward edge toward the point of said fishhook, said anvil being provided along its rearward edge with a groove adapted to engage the bight portion of the fishhook, said groove extending around the free end of said anvil and opening through the forward edge thereof,
  c. a pair of generally planar stripper plates mounted on said extractor and disposed in generally parallel relation at respectively opposite transverse sides of said anvil, whereby to be disposed at opposite sides of the plane of a fishhook engaged by said anvil, said plates being movably associated with said anvil and having operative edges operable by said movement to advance forwardly of said anvil to strip the flesh of a fish from the point of said fishhook, the operative edges of said stripper plates being disposed forwardly of said anvil at all times, and being provided with inturned lips, the lips of the two plates being spaced apart by a distance generally equal to the transverse width of said groove, and,
  d. manually operable actuating means mounted on the extractor at the opposite end of said shank operable to produce said relative movement of said anvil and stripper plates.

2. A fishhook extractor as recited in claim 1 wherein said stripper plates are pivoted to said anvil on a common axis spaced apart from the free end of the anvil, and wherein the operative edges of said plates have a first position generally parallel to the forward edge of said anvil intermediate the pivotal axis of the plates and the extended point of the fishhook, but are movable forwardly and longitudinally away from the free end of the anvil to a second position by pivotal movement of said plates relative to said anvil, said actuating means being operable to pivot said stripper plates between said first and second positions.

3. A fishhook extractor as recited in claim 2 with the addition of resilient means mounted on the extractor and biasing said stripper plates to said first position.

4. A fishhook extractor as recited in claim 2 wherein said shank is tubular, and wherein said actuating means comprises:
  a. a rod carried for axial sliding movement in said shank and extending from both ends thereof, said anvil being affixed to one extended end of said rod,
  b. means interconnecting said stripper plates to said shank whereby sliding motion of said rod in said shank produces pivotal movement of said plates relative to said anvil, and
  c. manual means at the opposite end of said shank and rod operable to slide said rod in said shank.

5. A fishhook extractor as recited in claim 4 wherein said connecting means constitutes a link pivoted at its respective ends to said shank and to said stripper plates, on axes remote from the pivotal connection of said stripper plates to said anvil.

6. A fishhook extractor as recited in claim 4 with the addition of resilient means biasing said rod in said shank in a direction to position said stripper plates in said first position, and wherein said manual means constitutes cooperating handles carried by said rod and shank operable to be grasped and relatively moved to move said rod in said shank to move said stripper plates to said second position.

* * * * *